US012767504B2

(12) United States Patent
Kim et al.

(10) Patent No.: US 12,767,504 B2
(45) Date of Patent: Oct. 20, 2026

(54) VEHICLE WITH LIFTING DEVICE

(71) Applicants: HYUNDAI MOTOR COMPANY, Seoul (KR); KIA CORPORATION, Seoul (KR)

(72) Inventors: Eun Sik Kim, Gwangmyeong-si (KR); Hyeong Seop Park, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 331 days.

(21) Appl. No.: 18/588,387

(22) Filed: Feb. 27, 2024

(65) Prior Publication Data

US 2025/0145432 A1 May 8, 2025

(30) Foreign Application Priority Data

Nov. 2, 2023 (KR) ........................ 10-2023-0150123

(51) Int. Cl.

| | |
|---|---|
| ***B66F 7/20*** | (2006.01) |
| ***B60S 9/10*** | (2006.01) |
| ***B62D 63/02*** | (2006.01) |
| ***B66F 7/06*** | (2006.01) |
| ***B66F 7/08*** | (2006.01) |

(52) U.S. Cl.
CPC *B66F 7/20* (2013.01); *B60S 9/10* (2013.01); *B66F 7/065* (2013.01); *B66F 7/08* (2013.01); *B62D 63/025* (2013.01)

(58) Field of Classification Search
CPC .......... B60S 9/02–10; B60S 9/12; B60S 9/14; B66F 7/06–0608; B66F 7/065; B66F 2700/12–126; B66F 3/22; B66F 3/245; B66F 9/07559; B62D 63/025
See application file for complete search history.

(56) References Cited

U.S. PATENT DOCUMENTS

| | | | | |
|---|---|---|---|---|
| 4,148,461 | A * | 4/1979 | Orth | B60S 9/06 254/122 |
| 2012/0168701 | A1 | 7/2012 | Rossato et al. | |
| 2018/0345971 | A1* | 12/2018 | Birnschein | B62D 21/152 |

FOREIGN PATENT DOCUMENTS

| | | | | |
|---|---|---|---|---|
| CN | 107601347 | A | 1/2018 | |
| JP | H07-33395 | A | 2/1995 | |
| JP | 2000-318974 | A | 11/2000 | |
| JP | 5894749 | B2 | 3/2016 | |
| KR | 1983-0009338 | A | 12/1983 | |
| KR | 2012-0064691 | A | 6/2012 | |
| WO | WO-9940262 | A1 * | 8/1999 | B66F 7/243 |
| WO | 2010/093090 | A1 | 8/2010 | |

OTHER PUBLICATIONS

Kwak Ho-ryong, "Hyundai Motor Group takes full aim at the commercial electric van market . . . Strategic Investment in American Canoeing," Retrieved from the internet at: <https://fntimes.com/html/view.php?ud=202002120912404529 7de3572ddd_18&mobile=1> dated Feb. 12, 2020.

* cited by examiner

*Primary Examiner* — Tyrone V Hall, Jr.
(74) *Attorney, Agent, or Firm* — MCDONNELL BOEHNEN HULBERT & BERGHOFF LLP

(57) ABSTRACT

A lifting device includes a skateboard constituting a lower portion of a vehicle body, a cabin detachably coupled to the skateboard to form an internal space of the vehicle body, and a link module coupled to the cabin and lifting the cabin from the ground.

19 Claims, 12 Drawing Sheets

VEHICLE WITH LIFTING DEVICE

CROSS REFERENCE TO RELATED APPLICATIONS

This application claims benefit of priority to Korean Patent Application No. 10-2023-0150123 filed on Nov. 2, 2023 in the Korean Intellectual Property Office, the disclosure of which is incorporated herein by reference in its entirety.

BACKGROUND

1. Field

The present disclosure relates to a vehicle including a lifting device.

2. Description of Related Art

A skateboard platform refers to a vehicle platform having a structure in which a battery and a drive motor are mounted in modular form on a skateboard platform and an upper cabin is mounted thereon. In the case of using the skateboard platform, there is an advantage in that various vehicle models may be produced on the same skateboard platform by only changing cabins, thereby maintaining high efficiency.

In addition, the size, weight, and number of portions of vehicles may be dramatically reduced to secure an occupancy space within the cabin. The platform length may be freely expanded to reduce development costs.

However, current skateboard platform technology is only advantageous in terms of common use for car manufacturers that produce vehicles, but it is not easy to utilize in reality because it is too difficult to mount and detach the cabin.

According to the related art, in order to mount and detach the cabin, it may be necessary to go to the factory and unscrew numerous pieces of hardware using special equipment and lift the cabin with a crane or the like to replace the cabin, so it may be better to purchase two cars, rather than using the skateboard platform.

SUMMARY

An aspect of the present disclosure is to provide a vehicle including a lifting device capable of easily replacing cabins on a skateboard platform.

According to an aspect of the present disclosure, a vehicle including a lifting device includes: a skateboard constituting a lower portion of a vehicle body; a cabin detachably coupled to the skateboard to form an internal space of the vehicle body; and a link module coupled to the cabin and lifting the cabin from the ground.

The link module may be provided on both sides of the cabin, respectively.

The link module may be provided to extend with an inclination to the outside of the cabin.

The link module may include: a first link and a second link rotatably coupled to each other in portions; a driving unit coupled to the first link to lift the cabin; and a support portion coupled to the first link and the second link and supporting the cabin by contacting the ground when the cabin is lifted.

One side of the second link may be rotatably coupled to the cabin and the other side of the second link may be supported by and slidably fixed to the support portion, and one side of the first link may be rotatably coupled to the driving unit and the other side of the first link may be rotatably coupled to the support portion.

A distance between a coupling position of the first link and the cabin and a coupling position of the support portion may be equal to a distance between a coupling position of the second link and the driving unit and the coupling position of the support portion.

The vehicle may further include a reinforcing portion provided between the link module and the cabin, wherein the reinforcing portion is bent at least twice.

The reinforcing portion may include a first bent portion and a second bent portion, the first bent portion may be provided between a lower portion of the cabin and a side surface of the cabin, and the second bent portion may surround the side surface of the cabin and is bent to the outside of the cabin.

The second bent portion may further include a lubricating portion including grooves having a predetermined length in a lateral direction of the cabin.

The vehicle may further include an anti-distortion portion connecting the support portions of the pair of link modules provided on both sides of the cabin and having a length increasing and decreasing.

According to another aspect of the present disclosure, a vehicle including a lifting device includes a vehicle body including a cabin having a boarding space and a skateboard coupled to the cabin to move the cabin, and a vehicle body height adjusting portion adjusting a height of the vehicle body.

The vehicle body height adjusting portion may be fixed to and supported by the cabin to be in the same position as the skateboard.

The vehicle body height adjusting portion may be provided on a wheel base portion.

The vehicle body height adjusting portion may include a link module including a first link and a second link, a driving unit coupled to the second link to lift the vehicle body, and a support portion coupled to the link module to support the ground.

The support portion further includes a shock absorbing portion on a lower surface.

The support portion may protrude to the outside of the cabin.

The vehicle body height adjusting portion may lift the cabin and the skateboard together.

The cabin may include a frunk and a trunk, and the cabin and the skateboard may be coupled through the frunk and the trunk.

The cabin and the skateboard may be detachably coupled, and the vehicle body height adjusting portion may lift only the cabin in a state in which the cabin and the skateboard are separated.

While the vehicle body height adjusting portion is lifting the cabin, the skateboard may be movable between the vehicle body height adjusting portions.

BRIEF DESCRIPTION OF THE FIGURES

The above and other aspects, features, and advantages of the present disclosure will be more clearly understood from the following detailed description, taken in conjunction with the accompanying drawings, in which.

DETAILED DESCRIPTION

Figure 1:
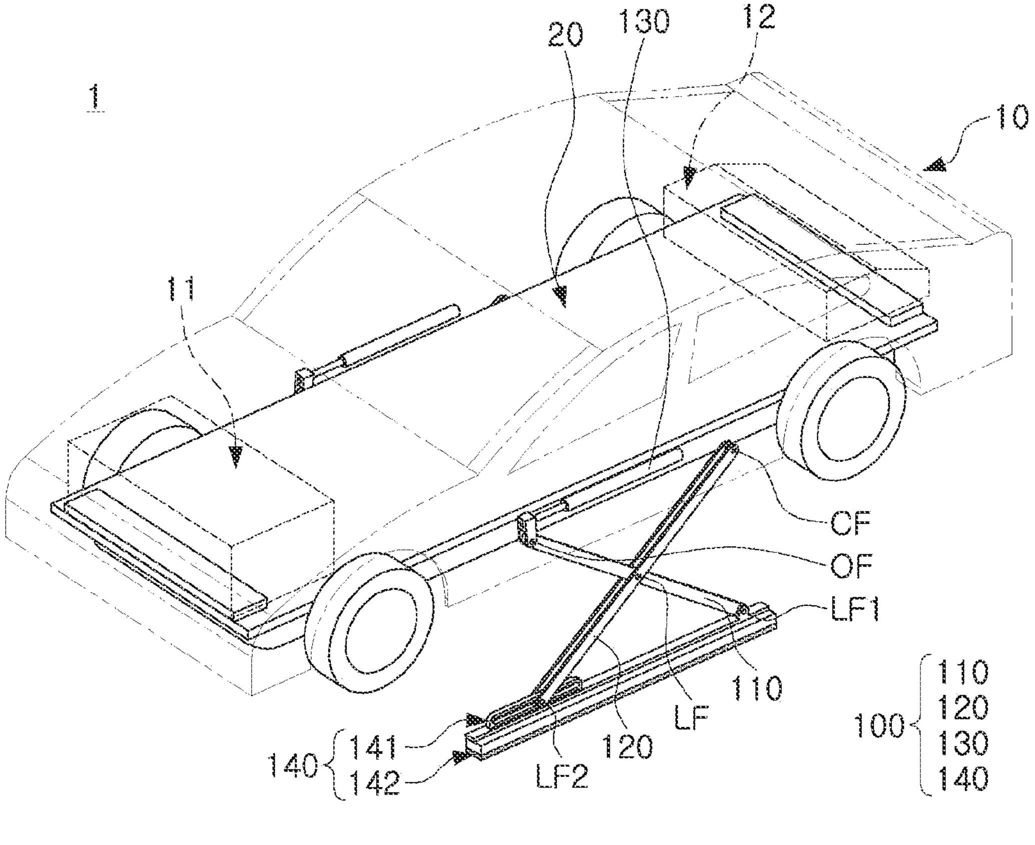
FIG. 1 is a perspective view of a vehicle including a lifting device according to an embodiment of the present disclosure.

While the present disclosure may be modified in various ways and take on various alternative forms, specific embodiments thereof are illustrated in the drawings and described in detail below. However, it should be understood that there is no intent to limit the present disclosure to the particular forms disclosed, but on the contrary, the present disclosure covers all modifications, equivalents, and alternatives falling within the spirit and scope of the present disclosure.

It will be understood that, although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present disclosure. As used herein, the term "and/or" includes any and all combinations of one or more of the associated listed items.

The terminology used herein to describe embodiments of the present disclosure is not intended to limit the scope of the present disclosure. The articles "a," and "an" are singular in that they have a single referent, however the use of the singular form in the present document should not preclude the presence of more than one referent. In other words, elements of the present disclosure referred to in the singular may number one or more, unless the context clearly indicates otherwise. It will be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof.

If it is not contrarily defined, all terms used herein including technological or scientific terms have the same meanings as those generally understood by a person with ordinary skill in the art. Terms defined in generally used dictionary shall be construed that they have meanings matching those in the context of a related art, and shall not be construed in ideal or excessively formal meanings unless they are clearly defined in the present application.

Hereinafter, embodiments of the present disclosure will be described in more detail with reference to the accompanying drawings.

Figure 2:
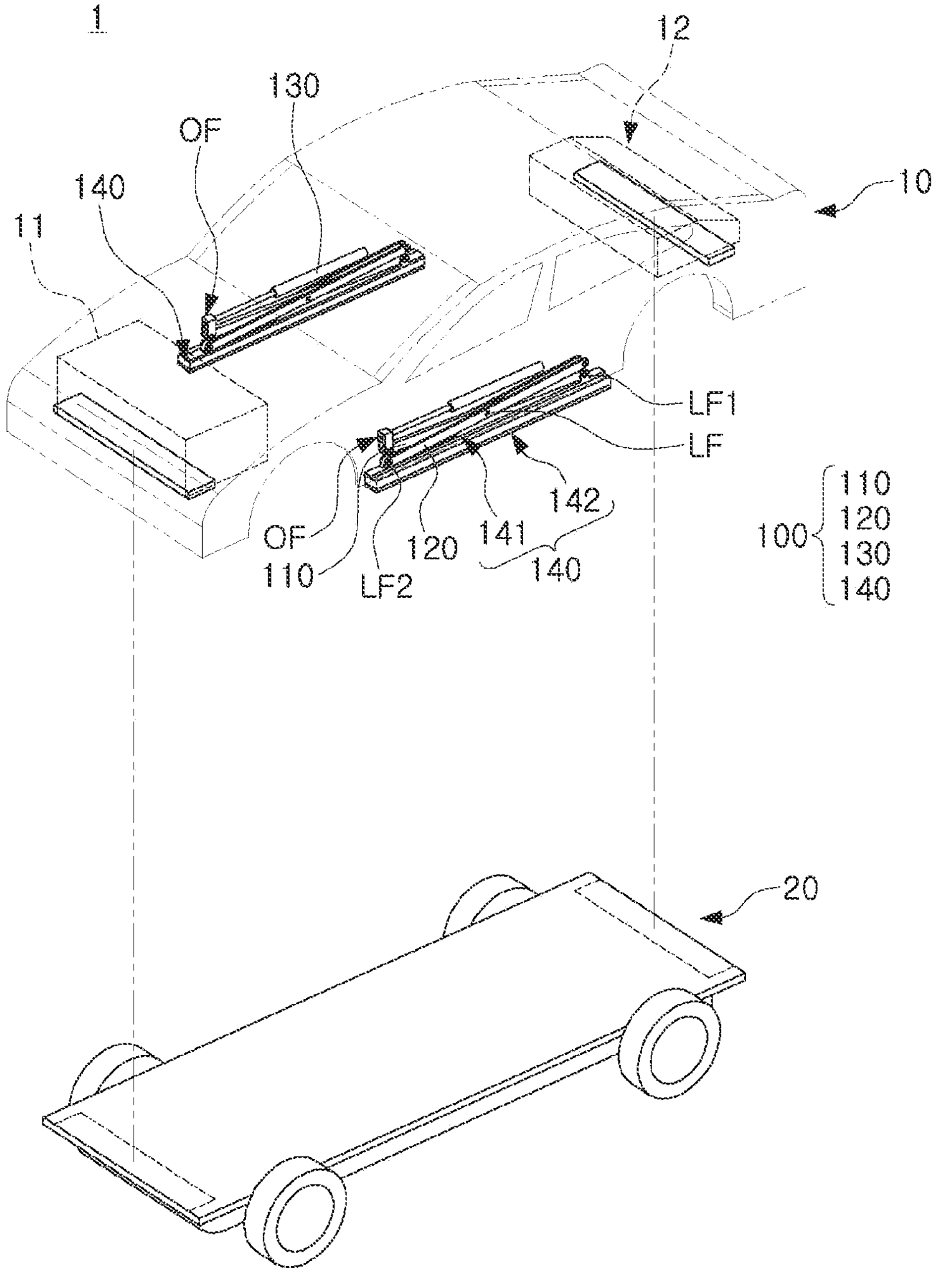
FIG. 2 is an exploded view of a cabin and a skateboard in a vehicle including a lifting device according to an embodiment of the present disclosure.
Figure 3:
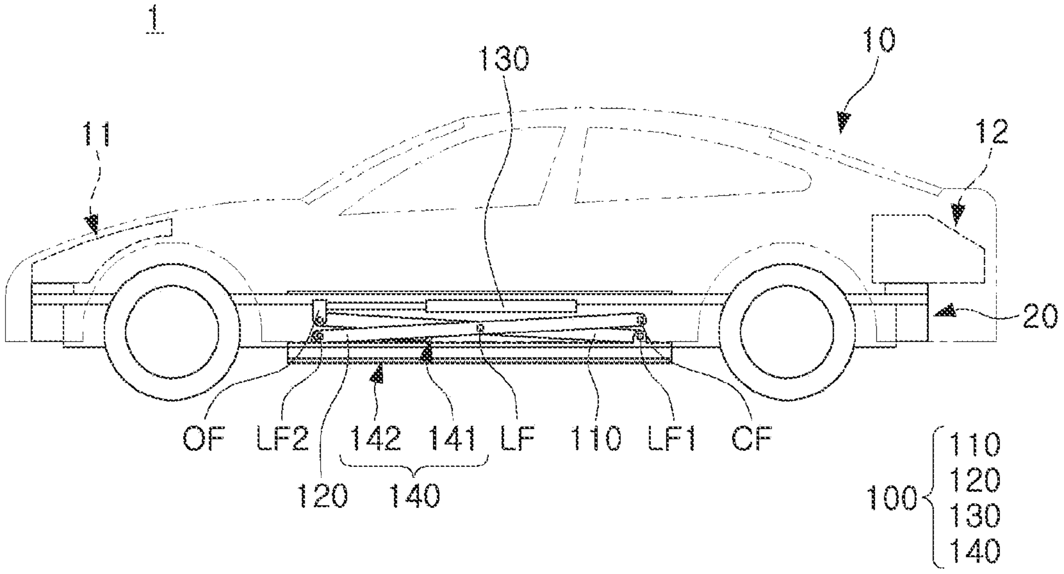
FIG. 3 is a side view of a vehicle including a lifting device according to an embodiment of the present disclosure.
Figure 4:
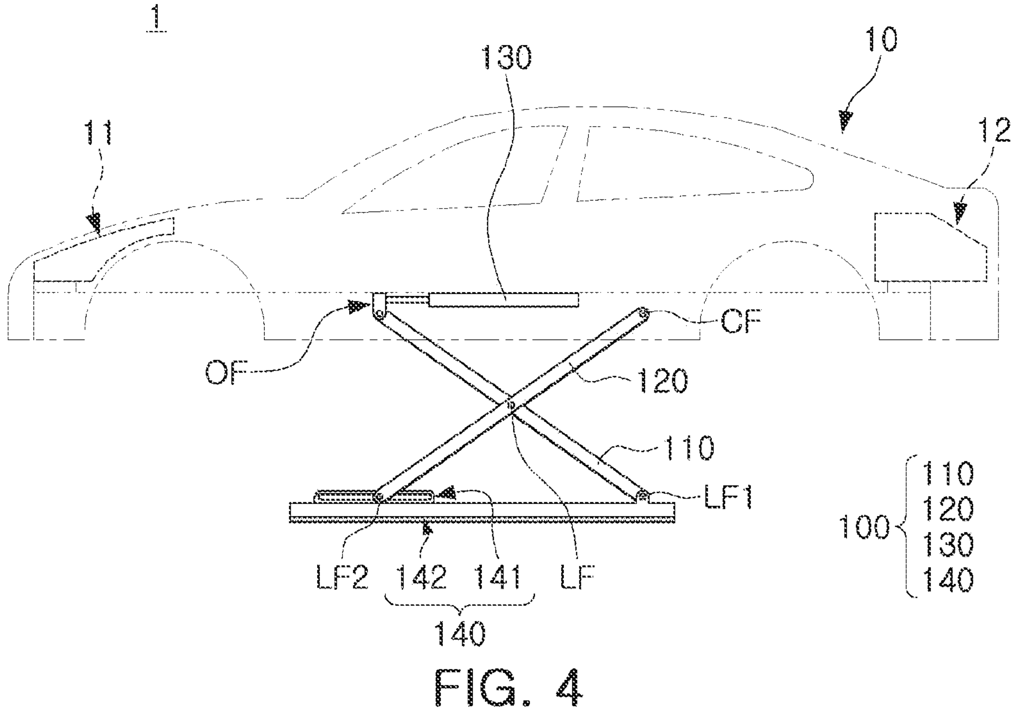
FIG. 4 is a side view illustrating a cabin and a lifting device in a state in which the cabin operates according to an embodiment of the present disclosure.

FIG. 1 is a perspective view of a vehicle including a lifting device 100 according to an embodiment of the present disclosure, FIG. 2 is an exploded perspective view of a cabin 10 and a skateboard 20 in a vehicle including the lifting device 100 according to an embodiment of the present disclosure, FIG. 3 is a side view of a vehicle including the lifting device 100 according to an embodiment of the present disclosure, and FIG. 4 is a side view illustrating the cabin 10 and the lifting device 100 in operation according to an embodiment of the present disclosure.

Referring to FIGS. 1 to 4, a vehicle body 1 of a vehicle in FIG. 1 may include the cabin 10 and the skateboard 20, and the lifting device 100 according to an embodiment of the present disclosure may be provided on both sides of the cabin 10.

The skateboard 20 may form a bottom surface of the vehicle body 1, and the skateboard 20 may include wheels, a suspension device, a battery, and a drive motor. Meanwhile, the skateboard 20 may include a connector (not shown) for the separate battery or the drive motor.

In addition, the skateboard 20 may be detachably coupled to the cabin 10 and move the cabin 10.

The cabin 10 may form a boarding space for a driver and an occupant and may be detachably coupled to the skateboard 20.

Referring to FIG. 2, the cabin 10 may include a frunk 11 at the front and a trunk 12 at the rear.

Here, the frunk 11 is an abbreviation for a front trunk and may be a storage space located in the front portion of the vehicle body 1. The frunk 11 is a storage space generally provided in electric vehicles and may correspond to a portion in which an engine is located in an internal combustion engine vehicle.

The cabin 10 according to an embodiment of the present disclosure may be detachably coupled to the skateboard 20 using a lower portion of the frunk 11 and a lower portion of the trunk 12.

Coupling panels may be provided lower surfaces of the frunk 11 and trunk 12 of the cabin 10 and on portions corresponding to the frunk 11 and trunk 12 of the skateboard 20, respectively. For example, the coupling panel may include a plurality of holes or recesses and may be coupled using coupling hardware (e.g., bolts, nuts, or screws) penetrating through the plurality of holes.

In addition, the coupling hardware may easily access through the bottom of the frunk 11 or trunk 12 in a state in which the frunk 11 or trunk 12 is open.

Referring back to FIGS. 1 to 4, the lifting device 100 may be provided on both sides of the cabin 10.

The lifting device 100 may be provided on both sides of the cabin 10 and extend toward the ground. In addition, one side of the lifting device 100 may contact the ground, support the ground, and lift the cabin 10 upwardly from the ground.

Here, the lifting device 100 may be provided at a height of the side of the skateboard 20. Through this, a reduction in boarding space of the cabin 10 due to the provision of the lifting device 100 may be prevented.

Figure 5:
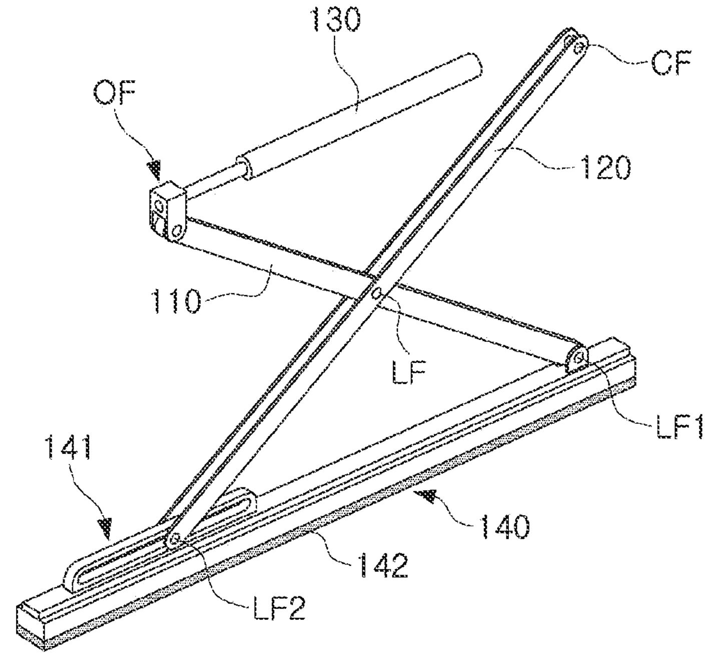
FIG. 5 is a perspective view of a lifting device according to an embodiment of the present disclosure.
Figure 6:
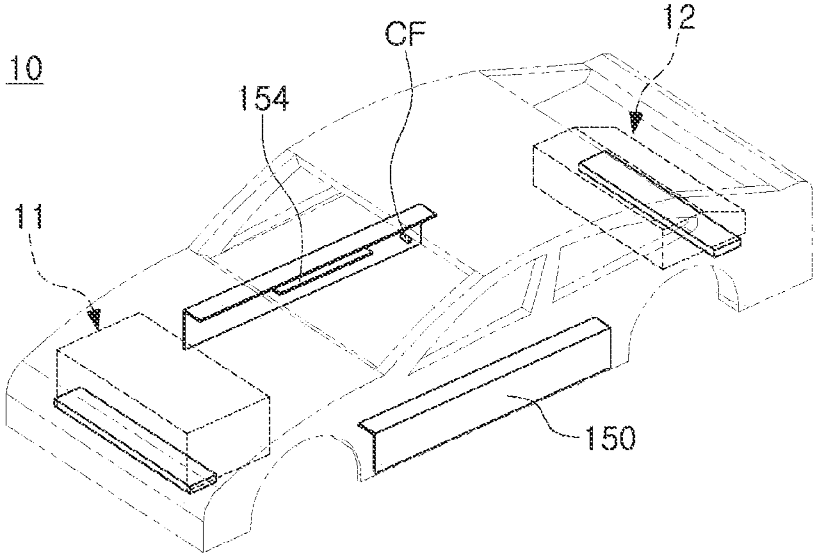
FIG. 6 is a perspective view of a cabin equipped with a reinforcing portion according to an embodiment of the present disclosure.
Figure 7:
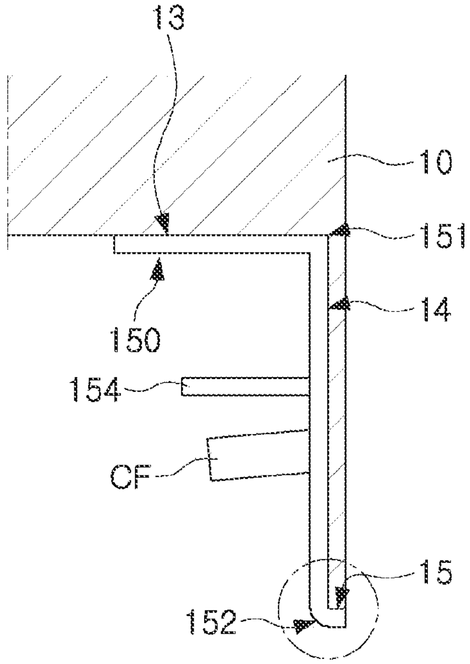
FIG. 7 is a front cross-sectional view illustrating a state in which a cabin and a reinforcing portion are coupled according to an embodiment of the present disclosure.
Figure 8:
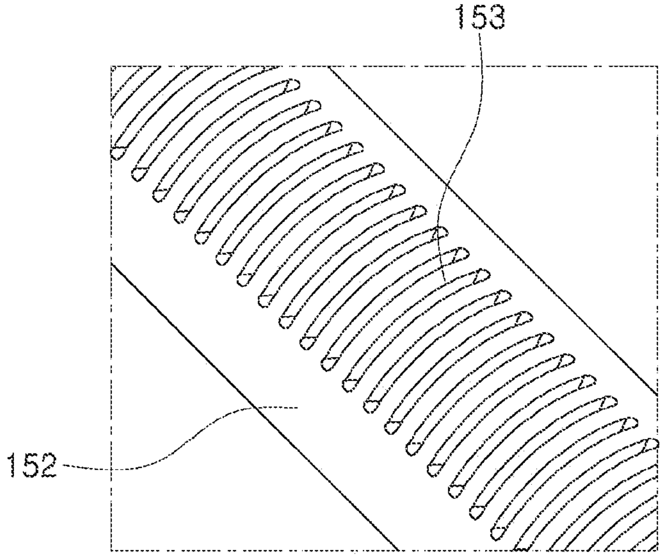
FIG. 8 is a perspective view illustrating a lubricating portion provided in a second reinforcing portion according to an embodiment of the present disclosure.

FIG. 5 is a perspective view of the lifting device 100 according to an embodiment of the present disclosure, FIG. 6 is a perspective view of the cabin 10 equipped with a reinforcing portion 150 according to an embodiment of the present disclosure, FIG. 7 is a front cross-sectional view illustrating a state in which the cabin 10 and the reinforcing portion 150 are coupled according to an embodiment of the present disclosure, and FIG. 8 is a perspective view illustrating a lubricating portion 153 provided in a second reinforcing portion 150 according to an embodiment of the present disclosure.

Referring to FIG. 5, the lifting device 100 may be a link module and may include a first link 110, a second link 120, a driving unit 130, and a support portion 140.

The first link 110 and the second link 120 may be in the form of a bar extending with a predetermined length. Here, a cross-section thereof may have various shapes, such as ring, circle, square, or the like.

One side of the first link 110 may be rotatably coupled to a driving unit 130 to be described below, and the other side thereof may be rotatably coupled to the support portion 140 to be described below.

One side of the second link 120 may be rotatably coupled to the cabin 10, and the other side thereof may be rotatable with respect to the support portion 140, which will be described below, and may be coupled to slide along the support portion 140.

Here, the first link 110 and the second link 120 may have the same length. More specifically, a length between a coupling position of the second link 120 with the cabin 10 and a coupling position of the support portion 140 may be equal to a length between a coupling position of the first link 110 with the driving unit 130 and the coupling portion of the support portion 140.

Here, the length between the coupling position of the first link 110 with the driving unit 130 and the coupling position of the support portion 140 may be referred to as a first length, and the length between the coupling position of the second link with the cabin 10 and the coupling position of the support portion 140 may be referred to as a second length.

In addition, the first link 110 and the second link 120 may be coupled so that at least a portion of the first link 110 and the second link 120 are mutually rotatable. For example, at least a portion of the first link 110 and at least a portion of the second link 120 may be connected by a link connection pin LF.

Here, a coupling position of the link connection pin LF may connect the center of the first link 110 and the center of the second link 120. More specifically, the link connection pin LF may be coupled to a position approximately half of the first length of the first link 110 and a position approximately half of the second length of the second link 120.

One side of the first link 110 changes in position depending on the driving unit 130 and is rotatably coupled to a driving unit connection pin OF, and the other side thereof may be rotatably coupled to the support portion 140, which will be described below. One side of the second link 120 is fixed to the cabin 10 and the support portion 140 in position but may be rotatably coupled to a cabin connection pin CF, and the other side thereof may slide along the support portion 140.

In addition, since the first link 110 and the second link 120 are partially rotatably coupled through the link connection pin LF, the position of the support portion 140 may change as the angle between the first link 110 and the second link 120 changes.

Therefore, before the support portion 140 touches the ground, the driving portion 130 may lower the support portion 140 to the ground, and after the support portion 140 touches the ground, the cabin 10 may rise due to a reaction.

Meanwhile, a rising height of the cabin 10 may be higher as the length of the link increases.

Referring back to FIG. 3, by providing the link module along the wheel base, the lengths of the first link 110 and the second link 120 may be secured to the maximum.

In addition, the connection position of the link module with the cabin 10 is configured to be approximately the same as the level of the skateboard 20, so that the influence of the addition of the link module on the boarding space of the cabin 10 may be minimized.

At least a portion of the driving unit 130 may be coupled to the cabin 10 so as to be supported, and another portion thereof may be rotatably coupled to the first link 110. The driving unit 130 may change in length, in a state of being coupled to the cabin 10 and may be coupled to the first link 110, so that an angle between the first link 110 and the second link 120 may change by adjusting the position of the first link 110 and the cabin 10 may be lifted by changing the position on the support portion 140 located on the other side of the second link 120.

The driving unit 130 may be a hydraulic or pneumatic cylinder, or may be a motor including a device (e.g., a pinion and rack structure, a ball screw, or the like) implementing a linear motion.

The lifting device 100 according to an embodiment of the present disclosure may further include a button for driving the driving unit 130.

The support portion 140 may be a plate extending in a longitudinal direction, and portions of an upper surface of the support portion 140 may be coupled to the first link 110 and the second link 120 and a lower surface thereof may contact the ground to support when the cabin 10 is lifted.

One side of the upper surface of the support portion 140 may be coupled to a first link connection pin LF1 so as to be rotatable with the first link 110, and a sliding portion 141 is provided on the other surface of the upper surface of the support portion 140 and coupled to the second link 120.

Here, the sliding portion 141 is a slot formed in the longitudinal direction on the upper surface of the support portion 140 and is connected to the other side of the second link 120 with a second link connection pin LF2 penetrating through the slot, so that the second link 120 may be rotatable with respect to the support portion 140 and may slide along the support portion 140.

The support portion 140 may further include a buffer portion 142 on a lower surface thereof to absorb shock when contacting the ground. The buffer portion 142 may be a rubber plate having a predetermined thickness and is provided entirely on the lower surface of the support portion 140.

The buffer portion 142 may reduce the amount of shock transmitted to the cabin 10 by absorbing shock upon contacting the ground.

Referring to FIGS. 6 to 8, the lifting device 100 according to an embodiment of the present disclosure may further include the reinforcing portion 150 provided on both sides of the lower portion of the cabin 10.

The reinforcing portion 150 may be a panel extending in the longitudinal direction of the vehicle body 1.

Referring to FIG. 7, the reinforcing portion 150 may include a first bent portion 151 and a second bent portion 152.

The first bent portion 151 may be provided between a first surface 13 and a second surface 14, and the second bent portion 152 may be provided between the second surface 14 and a third surface 15. In addition, the first surface 13 may be coupled to a lower portion of the cabin 10, the second surface 14 may be coupled to the side of the cabin 10, and the third surface 15 may be coupled to a lower side of the cabin 10.

In addition, they may be coupled to the first surface 13 or the second surface 14 and the cabin 10 by welding or bolting. The first surface 13 may be coupled to a lower portion of the cabin 10, and the second surface 14 may be coupled to the side of the cabin 10.

Here, the reinforcing portion 150 may be coupled to both the lower surface of the cabin 10 and the side surface of the cabin 10 through the first surface 13 and the second surface 14, thereby improving strength of the cabin 10, as well as rigidity of the reinforcing portion 150 itself.

The reinforcing portion 150 may include two bent portions of the first bent portion 151 and the second bent portion 152, and since the two bent portions are bent in different directions, the strength of the reinforcing portion 150 may be further strengthened.

The second bent portion 152 surrounds the side surface of the cabin 10 and may be formed on the outside of the vehicle body 1 of the cabin 10. The second bent portion 152 may prevent the cabin 10 from coming into direct contact with the first link 110 and the second link 120, which move when the cabin 10 is lifted and lowered, and may prevent the cabin 10 from being deformed upon contact.

In addition, the second bent portion 152 may further include a lubricating portion 153.

Referring to FIG. 8, the lubricating portion 153 may be a groove formed with a predetermined length on the surface of the second bent portion 152, and may be formed in plural numbers along the second bent portion 152. The groove of the lubricating portion 153 may guide a movement direction of the first link 110 and the second link 120, so that the first link 110 and the second link 120 may smoothly move even when the second bent portion 152 comes into contact with the first link 110 and the second link 120.

The reinforcing portion 150 may further include a driving unit fixing portion 154 and a cabin connection pin CF.

The driving unit fixing portion 154 may fix and support the driving unit 130.

The cabin connection pin CF may be rotatably coupled to one side of the first link 110.

The cabin connection pin CF and the driving unit fixing portion 154 may be formed so that the first link 110 and the second link 120 may extend at an angle to the outside of the cabin 10.

Figure 9:
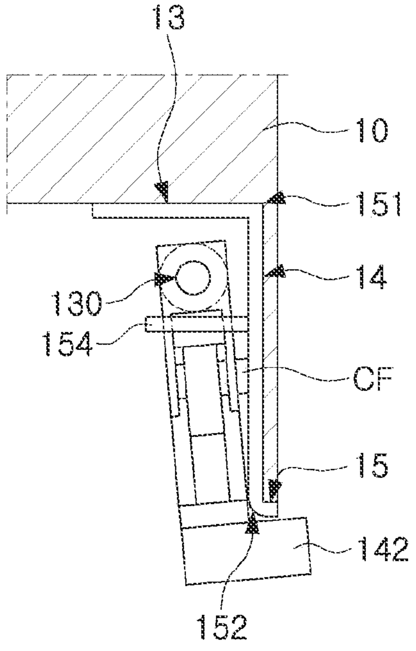
FIG. 9 is a front cross-sectional view illustrating a state in which a cabin and a lifting device kept in storage are coupled according to an embodiment of the present disclosure.
Figure 10:
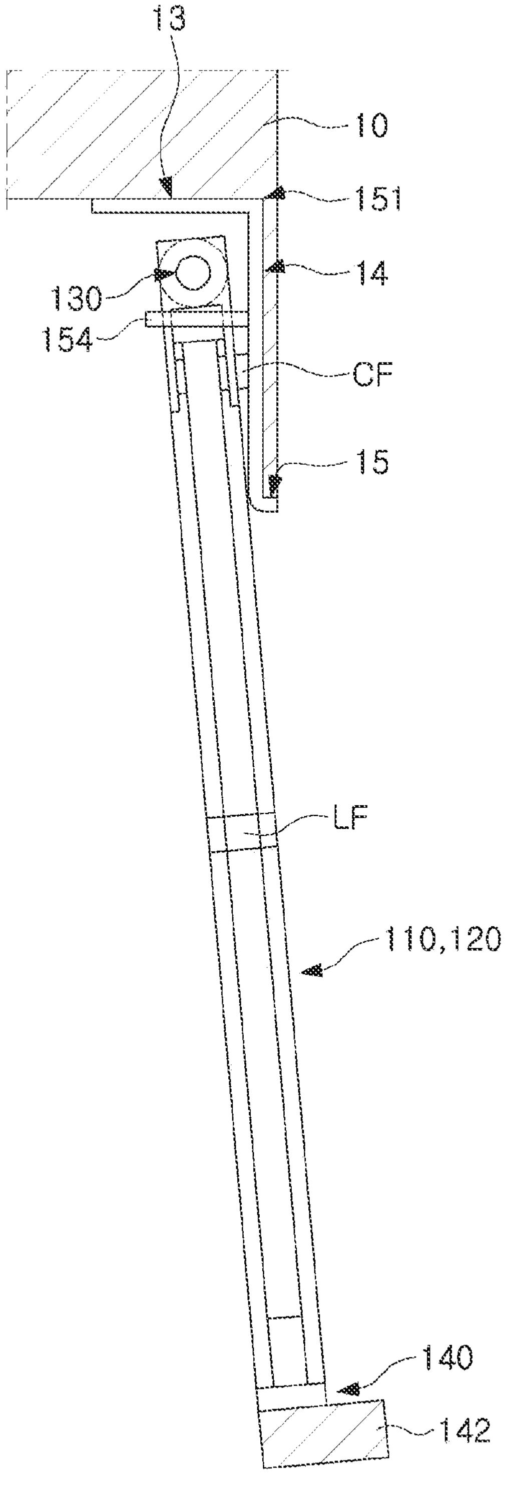
FIG. 10 is a front cross-sectional view illustrating a state in which a cabin and a lifting device in operation are coupled according to an embodiment of the present disclosure.

FIG. 9 is a front cross-sectional view illustrating a state in which the cabin 10 and the lifting device 100 kept in storage are coupled according to an embodiment of the present disclosure, and FIG. 10 is a front cross-sectional view illustrating a state in which the cabin 10 and the lifting device 100 in operation are coupled according to an embodiment of the present disclosure;

Referring to FIGS. 9 and 10, as the lifting devices 100 provided on both sides of the cabin 10 extends in a state of being inclined to the outside of the vehicle body 1, when the cabin 10 is lifted, a trapezoid is formed with the ground, thereby avoiding interference with the skateboard 20, and the cabin 10 may be supported more stably.

Here, the inclination may be formed so that the skateboard 20 may move forward or backward without interfering with the lifting device 100 while the support portion 140 is in contact with the ground.

Figure 11:
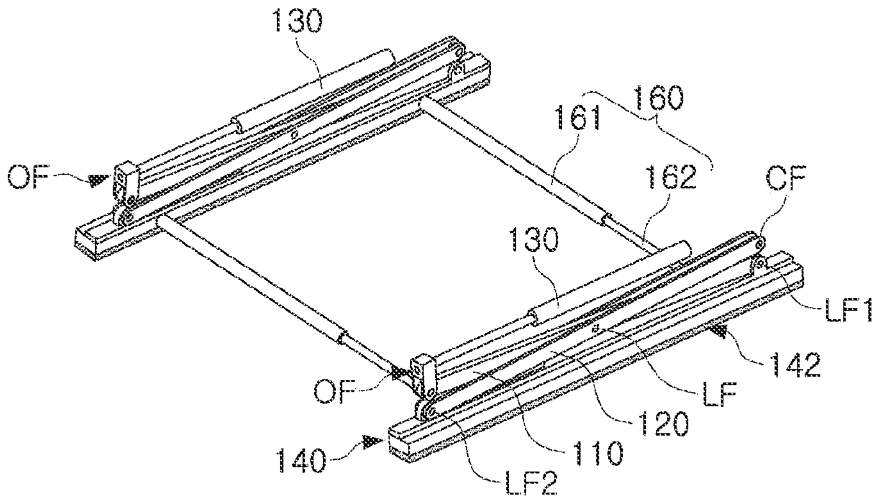
FIG. 11 is a perspective view of a lifting device further including a distortion prevention portion according to another embodiment of the present disclosure.
Figure 12A:
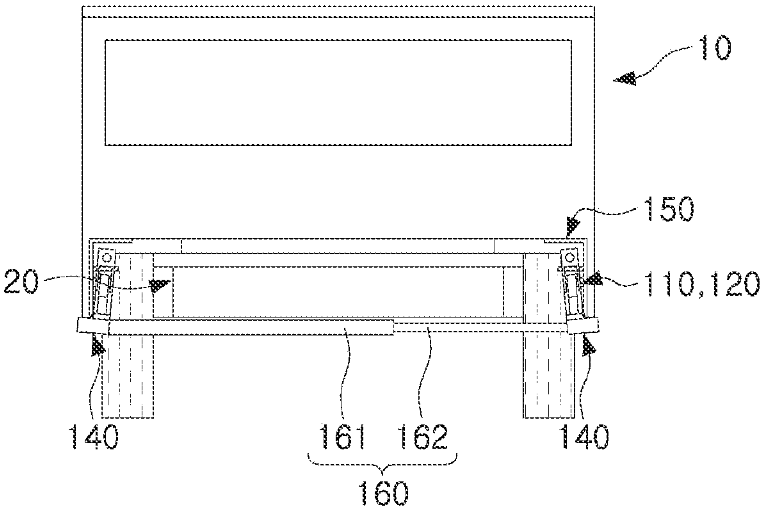
FIGS. 12A and 12B are a front cross-sectional view illustrating a state in which a cabin and a lifting device kept in storage are coupled according to another embodiment of the present disclosure.
Figure 12B:
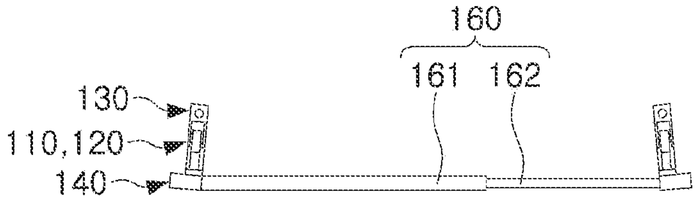
Figure 13A:
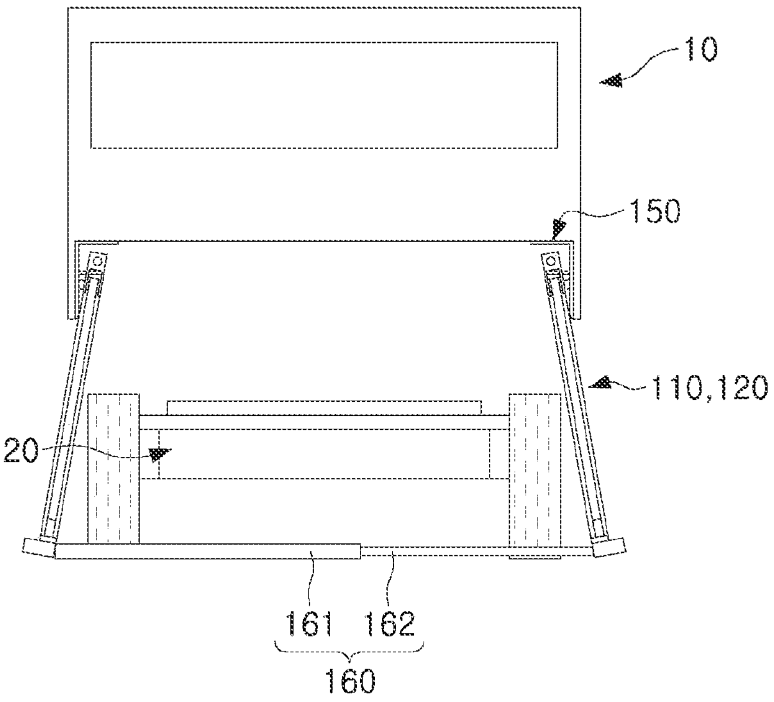
FIGS. 13A and 13B are a front cross-sectional view illustrating a state in which a cabin in operation and a lifting device are coupled according to another embodiment of the present disclosure.
Figure 13B:
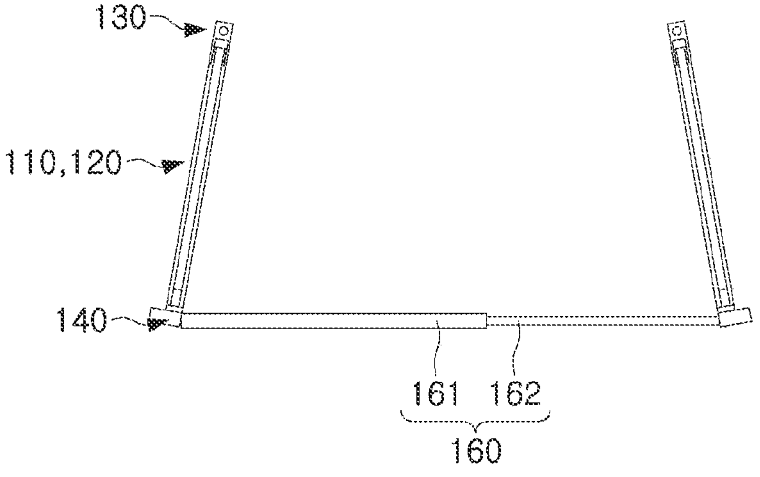

FIG. 11 is a perspective view of the lifting device 100 further including an anti-distortion portion 160 according to another embodiment of the present disclosure, FIG. 12 is a front cross-sectional view illustrating a state in which the cabin 10 and the lifting device 100 kept in storage are coupled according to another embodiment of the present disclosure, and FIG. 13 is a front cross-sectional view illustrating a state in which the cabin 10 in operation and the lifting device 100 are coupled according to another embodiment of the present disclosure.

Referring to FIG. 11, the lifting device 100 according to another embodiment of the present disclosure may further include the anti-distortion portion 160.

In a pair of lifting devices 100 provided on both sides of the cabin 10, the anti-distortion portion 160 connects each support portion 140 to prevent the pair of lifting devices 100 from being distorted when the support portion 140 is lowered.

The anti-distortion portion 160 may increase or decrease in length. The lifting device 100 is configured to be inclined toward the outside of the cabin 10, so that the support portions 140 provided on both sides of the cabin 10 may move in a direction away from each other when lowered to the ground.

Accordingly, the anti-distortion portion 160 may change in length when the pair of support portions 140 are lifted or lowered to connect the pair of support portions 140 without interfering with the movement of the lifting device.

Here, the anti-distortion portion 160 may include a guide 161 having a hollow cross-section and a rod 162 that is inserted and supported in the hollow cross-section of the guide 161.

In the anti-distortion portion 160 connected to a pair of support portions 140 provided on the left and right sides of the cabin 10, one side of the guide 161 may be fixed to one support portion 140 and the other side may be connected by inserting the rod 162 into the hollow cross-section. In addition, one side of the rod 162 may be inserted into and connected to the hollow cross-section of the guide 161, and the other side may be fixed to the other support portion 140.

Referring to FIGS. 12 and 13, the rod 162 has a sufficient length and is inserted, supported, and connected to the guide 161, so that when the support portion 140 is lowered, the rod 162 moves to the outside of the guide 161, and when the support portion 140 is lifted or lowered, the rod 162 may be inserted into the guide 161 to change in length, thereby connecting the pair of support portions 140.

Figure 14:
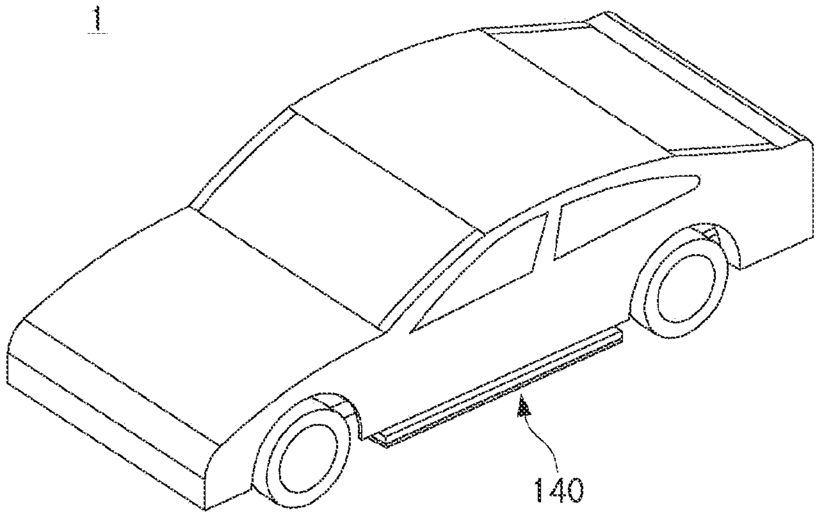
FIG. 14 is a perspective view of a vehicle including a lifting device according to another embodiment of the present disclosure.

FIG. 14 is a perspective view of a vehicle including the lifting device 100 according to another embodiment of the present disclosure.

Referring to FIG. 14, the support portion 140 of the lifting device 100 may be formed to protrude to the outside of the cabin 10.

In particular, when a sport utility vehicle (SUV) vehicle support portion 140 is formed to protrude to the outside of the cabin 10, since the body 1 of the SUB vehicle is high, a door of a nearby vehicle in a parking lot may be prevented from contacting the cabin 10 and deforming the cabin 10.

In addition, the support portion 140 of the lifting device 100 may further include an anti-slip portion on an upper surface protruding to the outside of the cabin 10. Similarly, when the SUV vehicle support portion 140 is formed to protrude to the outside of the cabin 10, it may help the elderly and children board the vehicle with a high ride height.

Figure 15:
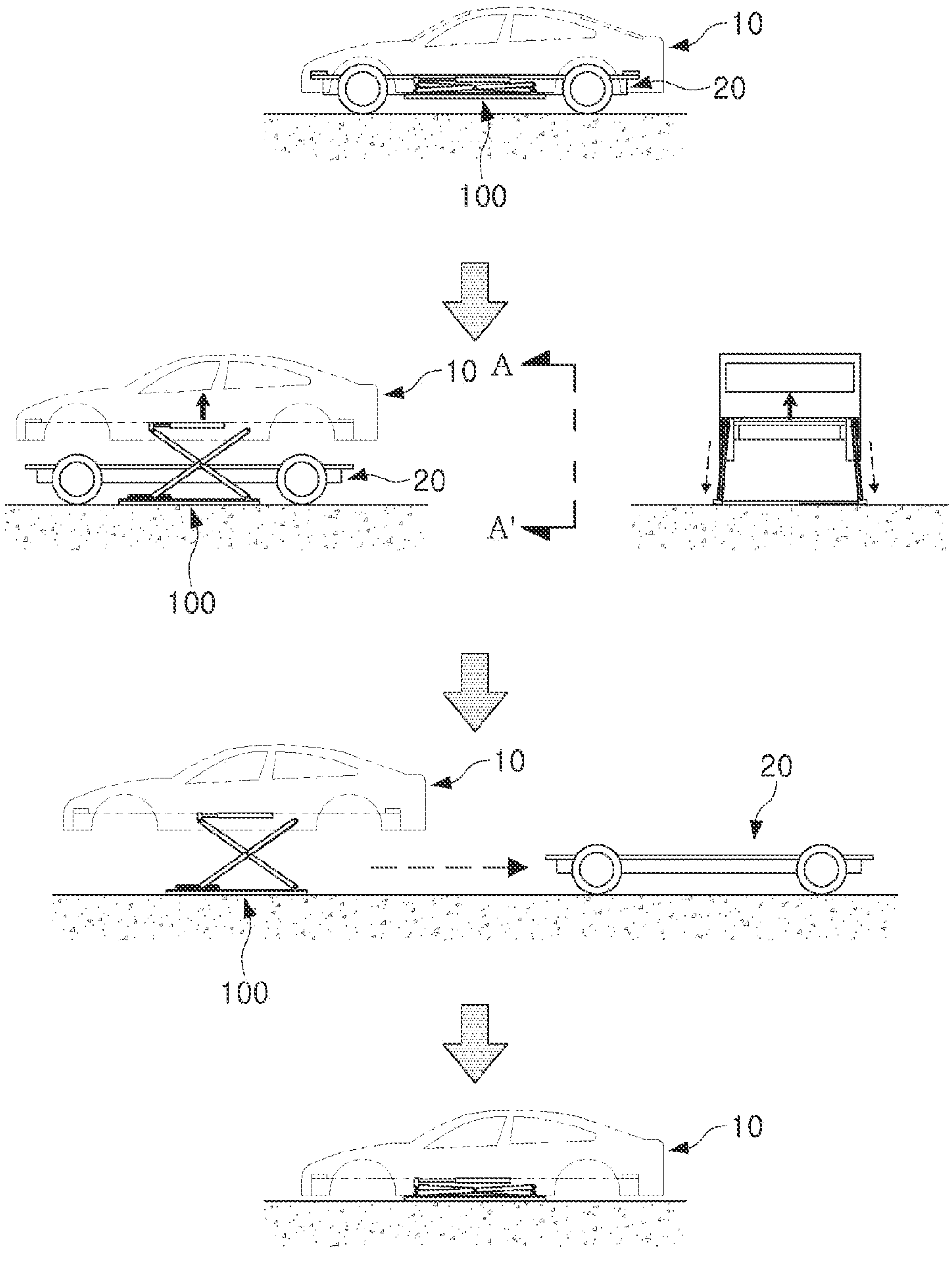
FIG. 15 is a diagram illustrating a process of separating a cabin using a lifting device according to an embodiment of the present disclosure.

FIG. 15 is a diagram illustrating a process of separating the cabin 10 using the lifting device 100 according to an embodiment of the present disclosure.

Referring to FIG. 15, the cabin 10 and the skateboard 20 may be separated. More specifically, a joint portion between the cabin 10 and the skateboard 20 at a lower portion of the frunk 11 and trunk 12 of the cabin 10 may be disassembled.

In a state in which the joint portion between the cabin 10 and the skateboard 20 is disassembled, the cabin 10 may be lifted by operating the lifting device 100.

Here, the lifting device 100 may extend in an inclined direction to the outside of the cabin 10. Through this, when the support portion 140 of the lifting device 100 contacts the ground, a spacing wider than that of the cabin 10 may be formed to stably support the cabin 10.

In addition, when the cabin 10 is lifted, the skateboard 20 separated from the cabin 10 may be moved without interfering with the lifting device 100.

In addition, the support portion 140 may further include the buffer portion 142, so that shock when the support portion 140 contacts the ground may be minimized from being transmitted to the cabin 10.

In addition, the lifting device 100 may further include the reinforcing portion 150 and the lubricating portion 153, thereby preventing deformation of the cabin 10 even when the cabin 10 is shaken by impact and allowing the cabin 10 to be lifted and lowered more smoothly while in contact with the lifting device 100.

After lifting the cabin 10, the skateboard 20 may be adjusted to move between the lifting devices 100.

After the skateboard 20 is moved to another location, it may be stored in a parking space or storage space by adjusting the lifting device 100 again.

Here, the coupling may be performed in the reverse order.

For example, after the stored cabin 10 is lifted using the lifting device 100, the skateboard 20 may be moved to a lower portion of the cabin 10. With the skateboard 20 and the cabin 10 in the correct position, the cabin 10 may be seated on the skateboard 20 using the lifting device 100. In this state, the cabin 10 and the skateboard 20 may be coupled using the frunk 11 and the trunk 12.

Here, in a case in which sufficient space is allowed, the cabin 10 may be immediately replaced using the lifting device 100.

For example, the cabin 10 coupled with the skateboard 20 may be located behind the stored cabin 10. As in the process described above, the stored cabin 10 and the replacement cabin 10 may be disassembled from the skateboard 20 and each may be lifted.

With the two cabins 10 lifted, the skateboard 20 may be moved to the stored cabin 10 and the stored cabin 10 and the skateboard 20 may be coupled. The disassembled cabin 10 may be lowered again and stored.

Figure 16:
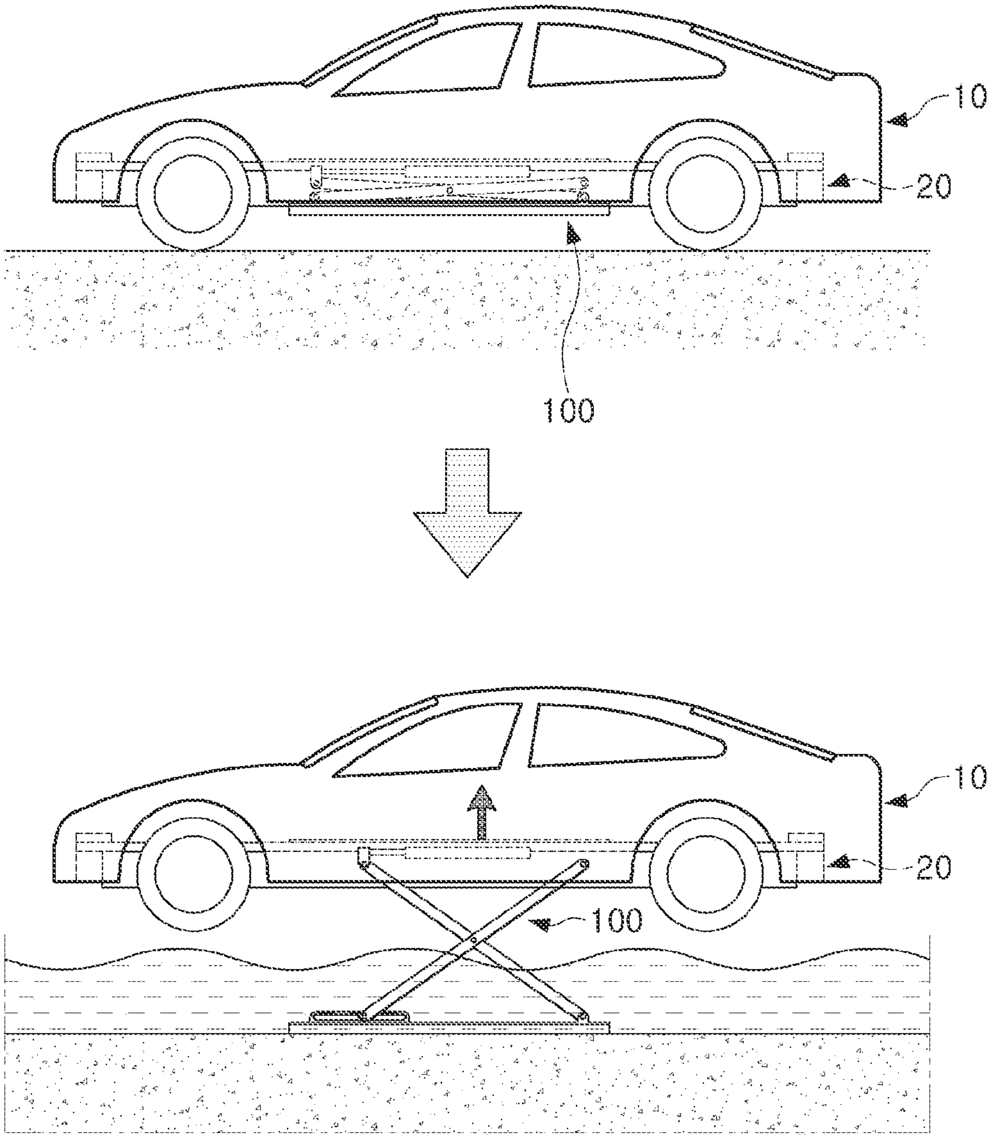
FIG. 16 is a diagram illustrating a process of using a lifting device in a flood situation according to another embodiment of the present disclosure.

FIG. 16 is a diagram illustrating a process of lifting a vehicle in a flood situation using the lifting device 100 according to another embodiment of the present disclosure.

Recently, vehicles are frequently flooded due to heavy rain or the like. Flooding of vehicles causes material damage and human casualties due to submersion of the engine, battery, and the like of vehicles.

Thus, in a flood situation, the lifting device 100 may be driven while the skateboard 20 is attached to the cabin 10. That is, the entire vehicle body 1 including both the cabin 10 and the skateboard 20 may be lifted using the lifting device 100. By driving in this manner, major parts of the vehicle may be prevented from being submerged in water and casualties may be prevented.

The lifting device 100 of the present embodiment has the same structure as the lifting device 100 described above with reference to FIGS. 1 to 15, except that the lifting device 100 is driven with the skateboard 20 attached to the cabin 10, so the detailed description of the lifting device 100 is replaced with the above description.

The vehicle including a lifting device according to an embodiment of the present disclosure may be used in various manners by combining a single skateboard with multiple cabins, making it easy to replace the skateboard and the cabin, thereby significantly increasing the usability of a vehicle.

The lifting device according to an embodiment of the present disclosure may protect important parts of the vehicle and, in particular, protect people by lifting the vehicle when flood damage occurs.

While example embodiments have been illustrated and described above, it will be apparent to those skilled in the art that modifications and variations could be made without departing from the scope of the present disclosure as defined by the appended claims.

The invention claimed is:

1. A vehicle including a lifting device, the vehicle comprising:

a skateboard constituting a lower portion of a vehicle body;

a cabin detachably coupled to the skateboard forming an internal space of the vehicle body; and a link module coupled to the cabin and configured to lift the cabin from the ground, wherein the link module is configured to extend with an inclination to an outside of the cabin.

2. The vehicle of claim 1, wherein the link module comprises a first link module positioned on one side of the cabin and a second link module positioned on an other side of the cabin.

3. The vehicle of claim 1, wherein the link module includes:

a first link and a second link rotatably coupled to each other;

a driving unit coupled to the first link and configured to lift the cabin; and a support portion coupled to the first link and the second link and supporting the cabin by contacting the ground when the cabin is lifted.

4. The vehicle of claim 3, wherein one side of the second link is rotatably coupled to the cabin and an other side of the second link is supported by and slidably fixed to the support portion, and one side of the first link is rotatably coupled to the driving unit and an other side of the first link is rotatably coupled to the support portion.

5. The vehicle of claim 3, wherein a distance between a coupling position of the first link and the cabin and a coupling position of the support portion is equal to a distance between a coupling position of the second link and the driving unit and the coupling position of the support portion.

6. The vehicle of claim 1, further comprising:

a reinforcing portion positioned between the link module and the cabin, wherein the reinforcing portion includes a first bent portion and a second bent portion.

7. The vehicle of claim 6, wherein the first bent portion is positioned between a lower portion of the cabin and a side surface of the cabin, and the second bent portion surrounds the side surface of the cabin and is bent toward an outside of the cabin.

8. The vehicle of claim 7, wherein the second bent portion further includes a lubricating portion including grooves having a predetermined length in a lateral direction of the cabin.

9. A vehicle including a lifting device, the vehicle comprising:

a skateboard constituting a lower portion of a vehicle body;

a cabin detachably coupled to the skateboard forming an internal space of the vehicle body;

a link module coupled to the cabin and configured to lift the cabin from the ground, wherein the link module includes a first link and a second link rotatably coupled to each other, a driving unit coupled to the first link and configured to lift the cabin and a support portion coupled to the first link and the second link and supporting the cabin by contacting the ground when the cabin is lifted; and an anti-distortion portion connecting a support portion of a first link module and a support portion of the second link module positioned on both sides of the cabin, and having a length configured to increase or decrease.

10. A vehicle including a lifting device, the vehicle comprising:

a vehicle body including a cabin having a boarding space and a skateboard coupled to the cabin, and configured to move the cabin; and a vehicle body height adjusting portion configured to adjust a height of the vehicle body, wherein the vehicle body height adjusting portion is configured to extend with an inclination to an outside of the cabin.

11. The vehicle of claim 10, wherein the vehicle body height adjusting portion is fixed to and supported by the cabin to be in the same position as the skateboard.

12. The vehicle of claim 10, wherein the vehicle body height adjusting portion is provided on a wheel base portion.

13. The vehicle of claim 10, wherein the vehicle body height adjusting portion includes:

a link module including a first link and a second link;

a driving unit coupled to the second link and configured to lift the vehicle body; and a support portion coupled to the link module and configured to support the ground.

14. The vehicle of claim 13, wherein the support portion further includes a shock absorbing portion on a lower surface.

15. The vehicle of claim 13, wherein the support portion protrudes to an outside of the cabin.

16. The vehicle of claim 10, wherein the vehicle body height adjusting portion is configured to lift the cabin and the skateboard together.

17. The vehicle of claim 10, wherein the cabin includes a frunk and a trunk, and the cabin and the skateboard are coupled through the frunk and the trunk.

18. The vehicle of claim 10, wherein the cabin and the skateboard are detachably coupled, and the vehicle body height adjusting portion lifts only the cabin in a state in which the cabin and the skateboard are separated.

19. The vehicle of claim 10, wherein, while the vehicle body height adjusting portion is lifting the cabin, the skateboard is movable between the vehicle body height adjusting portions.

* * * * *